(12) United States Patent
Benevelli et al.

(10) Patent No.: US 10,494,040 B2
(45) Date of Patent: Dec. 3, 2019

(54) TILTING SYSTEM FOR A SUSPENDED CAB OF A WORK VEHICLE

(71) Applicant: CNH Industrial America LLC, New Holland, PA (US)

(72) Inventors: Alessandro Benevelli, Albinea (IT); Francesco Paolini, Modena (IT); John Cloud, Wichita, KS (US); Daniel Seacat, Valley Center, KS (US)

(73) Assignee: CNH Industrial America LLC, New Holland, PA (US)

( * ) Notice: Subject to any disclaimer, the term of this patent is extended or adjusted under 35 U.S.C. 154(b) by 158 days.

(21) Appl. No.: 15/695,679

(22) Filed: Sep. 5, 2017

(65) Prior Publication Data
US 2019/0071136 A1    Mar. 7, 2019

(51) Int. Cl.
*B62D 33/067* (2006.01)
*B62D 33/07* (2006.01)
*B62D 33/06* (2006.01)

(52) U.S. Cl.
CPC ......... *B62D 33/07* (2013.01); *B62D 33/0617* (2013.01); *B62D 33/0604* (2013.01); *B62D 33/067* (2013.01)

(58) Field of Classification Search
CPC .................................................. B62D 33/067
USPC ......... 180/89.14, 89.15; 296/190.04, 190.05, 296/190.06
See application file for complete search history.

(56) References Cited

U.S. PATENT DOCUMENTS

| | | | |
|---|---|---|---|
| 3,761,123 A * | 9/1973 | Neill .................... | B62D 33/07 180/89.15 |
| 3,853,368 A | 12/1974 | Eichelsheim | |
| 3,958,659 A | 5/1976 | Selman | |
| 4,105,087 A | 8/1978 | Levington | |
| 4,411,332 A * | 10/1983 | Eichelsheim ........ | B62D 33/071 137/614.17 |
| 4,463,818 A | 8/1984 | Sonneborn | |
| 4,493,386 A * | 1/1985 | Sonneborn ........... | B62D 33/07 180/89.15 |
| 7,055,637 B2 | 6/2006 | Mallan et al. | |
| 8,820,818 B2 | 9/2014 | Beumer | |
| 2017/0233015 A1* | 8/2017 | Knutson ............. | E02F 9/2004 296/190.05 |

FOREIGN PATENT DOCUMENTS

| | | | | |
|---|---|---|---|---|
| EP | 0784159 A1 * | 7/1997 | ........... | B62D 33/067 |
| GB | 2079378 A * | 1/1982 | ........... | B62D 33/067 |
| GB | 2103287 A | 2/1983 | | |
| WO | WO-0000378 A1 * | 1/2000 | ........... | B62D 33/067 |

* cited by examiner

*Primary Examiner* — Ruth Ilan
(74) *Attorney, Agent, or Firm* — Peter K. Zacharias; Patrick M. Sheldrake

(57) ABSTRACT

A tilting system for a suspended cab of a work vehicle includes a hydraulic cylinder coupled to a chassis of the work vehicle at a first end and the suspended cab at a second end. Further, the hydraulic cylinder is configured to extend to drive the suspended cab to rotate from a lowered position to a raised position. In addition, the hydraulic cylinder is configured to be substantially horizontal while the suspended cab is in the lowered position.

20 Claims, 4 Drawing Sheets

TILTING SYSTEM FOR A SUSPENDED CAB OF A WORK VEHICLE

BACKGROUND

The present disclosure relates generally to a tilting system for a suspended cab of a work vehicle.

Certain work vehicles (e.g., tractors, harvesters, skid steers, etc.) include a cab configured to house an operator. To facilitate access to certain components of the work vehicle (e.g., the engine, the transmission, etc.), the cab may rotate forwardly relative to a chassis of the work vehicle about a pivot joint. The work vehicle may also include a biasing element configured to urge the cab to rotate forwardly. In addition, the work vehicle may include a suspension system to reduce the transmission of energy from the chassis to the cab. However, the biasing element may interfere with operation of the suspension system, thereby reducing the effectiveness of the suspension system.

BRIEF DESCRIPTION

In one embodiment, a tilting system for a suspended cab of a work vehicle includes a hydraulic cylinder coupled to a chassis of the work vehicle at a first end and the suspended cab at a second end. Further, the hydraulic cylinder is configured to extend to drive the suspended cab to rotate from a lowered position to a raised position. In addition, the hydraulic cylinder is configured to be substantially horizontal while the suspended cab is in the lowered position.

In another embodiment, a work vehicle includes a suspension system configured to control movement of a suspended cab relative to a chassis of the work vehicle. The work vehicle also includes a pivot joint configured to rotatably couple the suspended cab to the chassis, and the pivot joint is configured to enable rotation of the suspended cab relative to the chassis. In addition, the work vehicle includes a tilting system that includes a hydraulic cylinder coupled to the chassis at a first end and the suspended cab at a second end. Further, the hydraulic cylinder is configured to extend to drive the suspended cab to rotate from a lowered position to a raised position. Moreover, the hydraulic cylinder is configured to be substantially horizontal while the suspended cab is in the lowered position.

In a further embodiment, a tilting system for a suspended cab of a work vehicle includes a hydraulic cylinder coupled to a chassis of the work vehicle at a first end and the suspended cab at a second end. Further, the hydraulic cylinder is configured to extend to drive the suspended cab to rotate from a lowered position to a raised position. In addition, the hydraulic cylinder is configured to be substantially horizontal while the suspended cab is in the lowered position. Moreover, the tilting system includes a first mounting structure configured to rotatably couple the hydraulic cylinder to the chassis at the first end. Also, the tilting system includes a second mounting structure configured to rotatably couple the hydraulic cylinder to the suspended cab at the second end.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
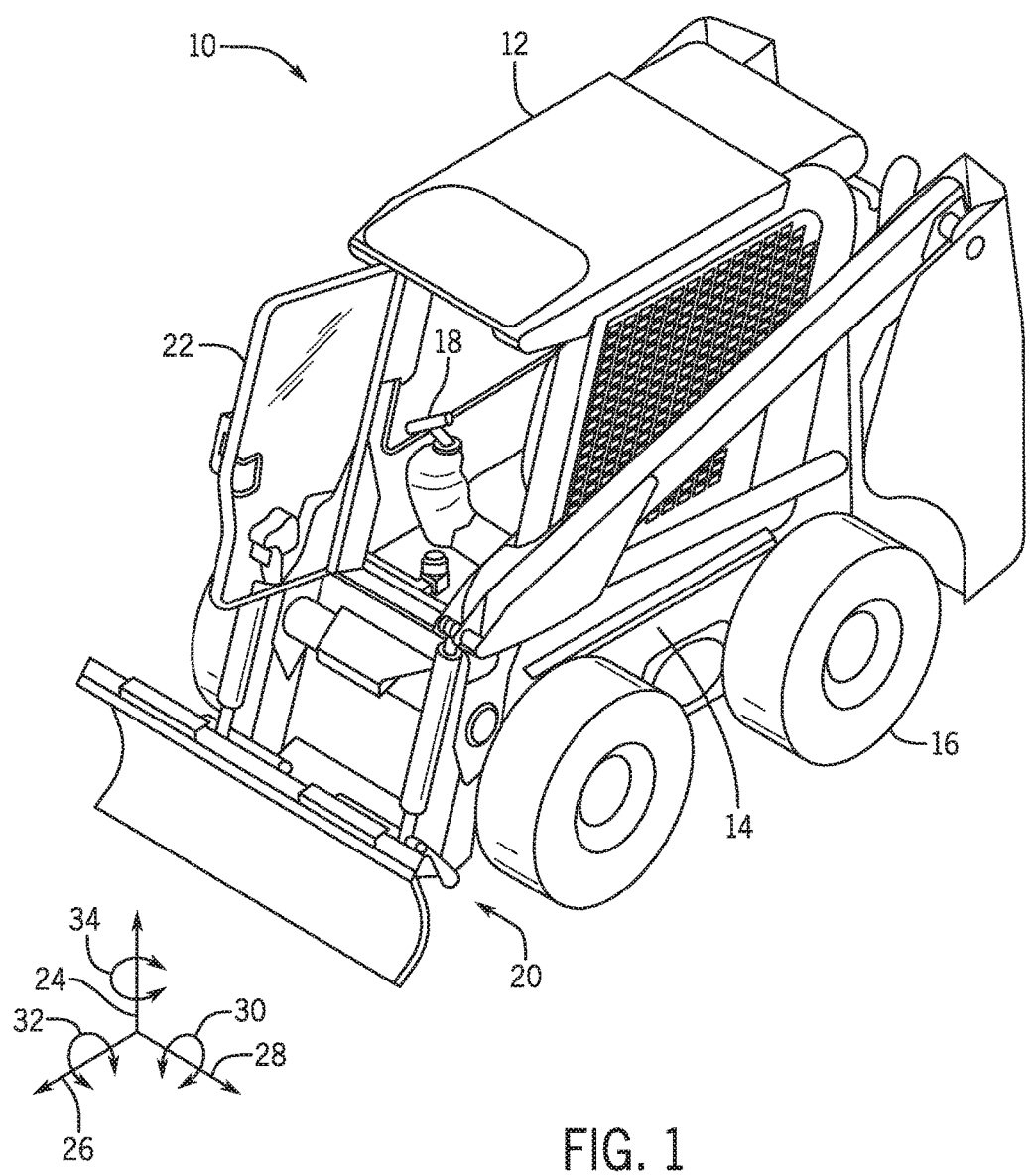
FIG. 1 is a perspective view of an embodiment of a work vehicle that may include a tilting system.

Turning to the drawings, FIG. 1 is a perspective view of an embodiment of a work vehicle 10 that may include a tilting system. In the illustrated embodiment, the work vehicle 10 is a skid steer. However, it should be appreciated that the tilting system disclosed herein may be utilized on other work vehicles, such as on-road trucks, tractors, harvesters, and construction equipment, among other work vehicles. In the illustrated embodiment, the work vehicle 10 includes a cab 12 and a chassis 14. In certain embodiments, the chassis 14 is configured to house a motor (e.g., diesel engine, etc.), a hydraulic system (e.g., including a pump, valves, reservoir, etc.), and other components (e.g., an electrical system, a cooling system, etc.) that facilitate operation of the work vehicle. In addition, the chassis 14 is configured to support the cab 12 and wheels 16. The wheels 16 may be driven to rotate by the motor and/or by component(s) of the hydraulic system (e.g., hydraulic motor(s), etc.). While the illustrated work vehicle 10 includes wheels 16, it should be appreciated that in alternative embodiments, the work vehicle may include tracks or a combination of wheels and tracks.

The cab 12 is configured to house an operator of the work vehicle 10. Accordingly, various controls, such as the illustrated hand controller 18, are positioned within the cab 12 to facilitate operator control of the work vehicle 10. For example, the controls may enable the operator to control rotational speed of the wheels 16, thereby facilitating adjustment of the speed and/or direction of the work vehicle 10. In addition, the controls may facilitate operator control of an implement, such as the illustrated blade 20. In the illustrated embodiment, the cab 12 also includes a door 22 to facilitate ingress and egress of the operator from the cab 12.

As discussed in detail below, the work vehicle 10 may include a titling system configured to rotate the cab 12 forward, thereby facilitating access to certain components within/coupled to the chassis 14. For example, the tilting system may enable the cab 12 to rotate relative to the chassis 14 about a lateral axis 28 of the work vehicle 10 in pitch 30. In addition, the tilting system may be configured such that the effects of the tilting system on a cab suspension system are reduced. Further, the suspension system may prevent rotation of the work vehicle about a vertical axis 24 in yaw 34 and about a longitudinal axis 26 in roll 32.

Figure 2:
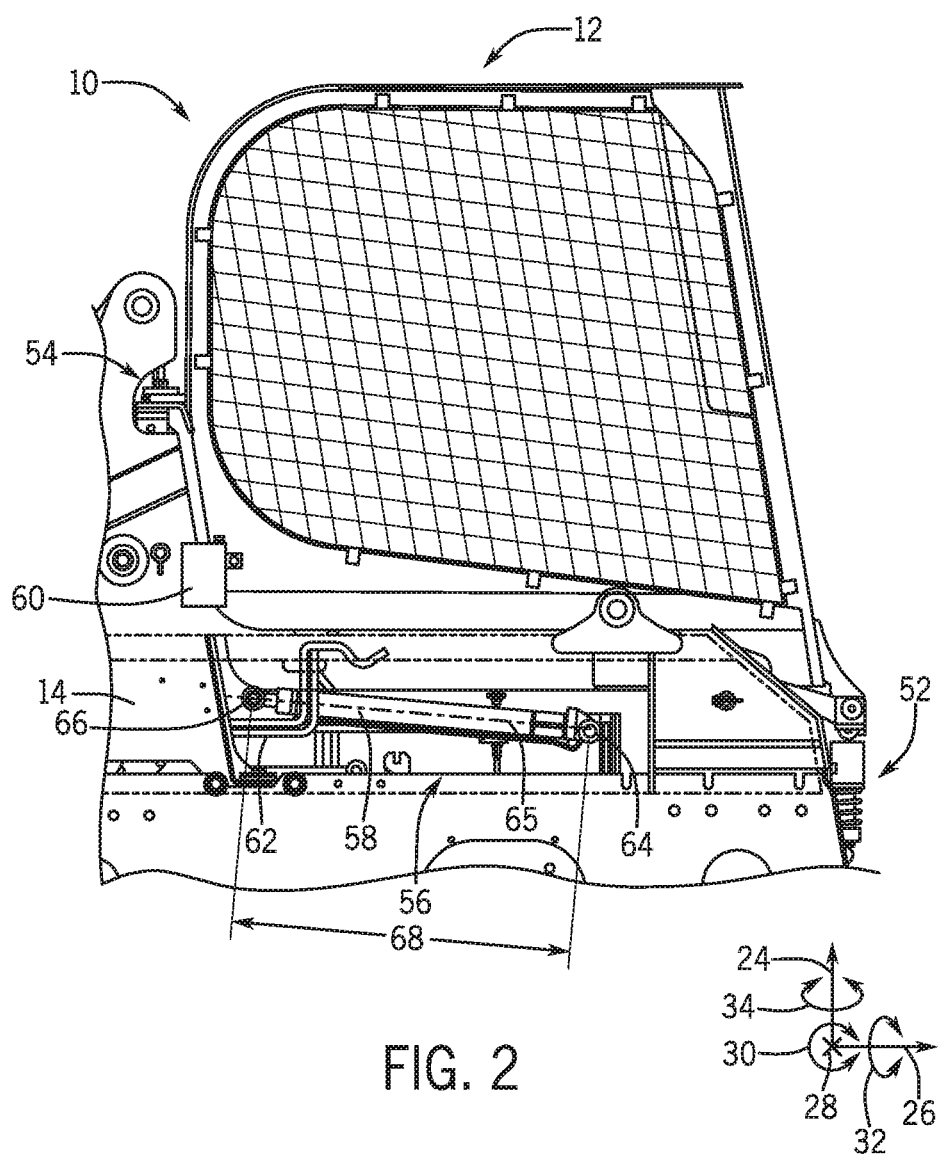
FIG. 2 is a side view of an embodiment of a tilting system that may be employed within the work vehicle of FIG. 1.

FIG. 2 is a side view of an embodiment of a tilting system 56 that may be employed within the work vehicle 10, in which the cab 12 in a lowered position. The work vehicle 10 includes a suspension system 52, a locking mechanism 54, and the tilting system 56. The cab suspension system 52 is configured to absorb energy (e.g., associated with movement/vibrations experienced by the chassis 14), thereby enhancing operator comfort. For example, the cab suspension system 52 may enable the cab 12 to move relative to the chassis 14 along the vertical axis 24 of the work vehicle 10, while damping energy associated with the movement. In addition, the cab suspension system 52 may be configured to substantially block movement of the cab 12 relative to the chassis 14 along the longitudinal axis 26 of the work vehicle 10 and along a lateral axis 28 of the work vehicle 10. The cab suspension system 52 may also enable the cab 12 to rotate relative to the chassis 14 about the lateral axis 28 in pitch 30 and about the longitudinal axis 26 in roll 32. However, the cab suspension system 52 may substantially block rotation of the cab 12 relative to the chassis 14 about the vertical axis 24 in yaw 34. In certain embodiments, the cab suspension system 52 includes a front suspension assembly and a rear suspension assembly. However, it should be appreciated that the cab suspension system may include only a front suspension assembly, only a rear suspension assembly, or a combination of the front and rear suspension assemblies.

The suspension assemblies utilize structure to dampen and reduce movement of the cab 12. Further, the suspension assemblies are tuned such that more or less dampening may decrease the comfort and/or ride quality of an operator in the cab 12. Accordingly, reducing the effects of the tilting system 56 on the suspension assemblies may increase the ability of the suspension assembly to provide increased comfort and/or ride quality to an operator in the cab 12.

The locking mechanism 54 is configured to block the cab 12 from rotating about the lateral axis 28 in pitch 30 from the illustrated lowered position to a raised position. For example, during operation, the cab 12 is coupled to the chassis 14 by the locking mechanism 54. Upon disengaging the locking mechanism 54, the cab 12 may be selectively rotated about the lateral axis 28 in pitch 30 to the raised position to provide access to components within/coupled to the chassis 14 (e.g., for maintenance). For example, when the locking mechanism 54 is disengaged (i.e., the locking mechanism 54 is in an unlocked position), the cab 12 may be rotated into the raised position. Further, while the cab 12 is in the lowered position, the locking mechanism 54 may be engaged (i.e., the locking mechanism 54 is in the locked position), thereby blocking rotation of the cab 12. In some embodiments, the locking mechanism 54 may rigidly couple the cab 12 to the chassis 14, or the locking mechanism 54 may enable the cab to rotate about one or more axes and/or translate along one or more axes. Further, the locking mechanism 54 may include any suitable device, including a latch, a clamp, a lock, or a bolt and nut.

The tilting system 56 is configured to drive the cab 12 to rotate while the locking mechanism 54 is in the unlocked position. The tilting system 56 includes a hydraulic cylinder 58, a hydraulic pump system 60, and fluid lines 62 that fluidly couple the hydraulic cylinder 58 to the hydraulic pump system 60. When the locking mechanism 54 is unlocked, the hydraulic cylinder 58 may extend, causing the cab 12 to rotate. As illustrated, the hydraulic cylinder 58 includes a rod and a cylinder and the cylinder is rotatably coupled to the chassis 14 at a first end 64, and the rod of the hydraulic cylinder 58 is rotatably coupled to the cab 12 at a second end 66. In some embodiments, the cylinder may be rotatably coupled to the cab at the second end, and the rod may be rotatably coupled to the chassis at the first end. Further, the hydraulic cylinder 58 may be rotatably coupled to the cab and chassis by any suitable mounting structure, including a bolt, u-joint, threaded coupling, or any other rotatable coupling. Further, while the cab 12 is in the lowered position, an axis 65 extending through the first end 64 and the second end 66 is substantially horizontal (e.g., along an axis parallel to the longitudinal axis 26). For example, the axis 65 may be at 0 to 1 degrees, 0 to 5 degrees, 0 to 10 degrees, 0 to 30 degrees, 1 to 5 degrees, 1 to 10 degrees, or 1 to 30 degrees with respect to the longitudinal axis 26. Further, the axis 65 may be less than 1, 2, 3, 5, 10, 15, 20, or 30 degrees with respect to the longitudinal axis 26. Further, while the cab 12 is in the raised position, the axis 65 is not substantially horizontal with respect to the longitudinal axis 26.

The rod and the cylinder of the hydraulic cylinder 58 may translate with respect to one another to increase or decrease a length 68 of the hydraulic cylinder 58. For example, the rod may extend to increase the length 68, and the rod may retract to decrease the length 68. Further, the hydraulic cylinder 58 may be at least partially filled with a fluid to bias the rod of the hydraulic cylinder 58 to extend or retract.

Further, the hydraulic pump system 60 contains a supply of fluid that may be utilized to drive the hydraulic cylinder 58 to extend and retract. For example, a pump may induce fluid to travel from the hydraulic pump system 60, through the fluid lines 62, and into the hydraulic cylinder 58. As more fluid is pumped into the first end 64 of the hydraulic cylinder 58, the pressure from the fluid drives the hydraulic cylinder 58 to extend, causing the cab 12 to rotate from the illustrated lowered position to a raised position. Conversely, as fluid is pumped into the second end 66 of the hydraulic cylinder 58, the pressure from the fluid drives the hydraulic cylinder 58 to retract, causing the cab 12 to rotate from the raised position to the illustrated lowered position.

As the work vehicle 10 travels along a surface, and while the locking mechanism 54 is in the locked position, the cab 12 may move relative to the chassis 14, as discussed above. Further, the illustrated position of the tilting system 56 may reduce the effects of the tilting system 56 on the suspension system, thereby improving the effects of the suspension system on the movement of the cab 12. For example, the hydraulic cylinder 58 remains coupled to both the cab 12 and the chassis 14, and, as the cab 12 moves relative to the chassis 14, the hydraulic cylinder 58 may extend and/or retract. The fluid within the hydraulic cylinder 58 may dampen the movement of the cab 12, which may decrease the effectiveness of the suspension system 52. In the illustrated embodiment, the hydraulic cylinder 58 is substantially horizontal (e.g., along an axis parallel to the longitudinal axis 26), such that extension and retraction of the hydraulic cylinder 58 is reduced as the cab 12 moves in the vertical direction 24. For example, the hydraulic cylinder 58 may be at 0 to 1 degrees, 0 to 5 degrees, 0 to 10 degrees, 0 to 30 degrees, 1 to 5 degrees, 1 to 10 degrees, or 1 to 30 degrees with respect to the longitudinal axis 26. Further, the hydraulic cylinder 58 may be less than 1, 2, 3, 5, 10, 15, 20, or 30 degrees with respect to the longitudinal axis 26.

Internal structure may also reduce the effects of the hydraulic cylinder on the suspension system. For example, the fluid within the hydraulic cylinder 58 may not be pressurized while the cab 12 is in the closed position, which further reduces the effects of the hydraulic cylinder 58 on the suspension system 52. Further, the hydraulic cylinder 58 may include a bypass valve that fluidly couples a chamber at the first end and a chamber at the second end. While the bypass valve is open, fluid may freely flow between these chambers, thereby reducing the effects of the hydraulic cylinder 58 on the suspension system. Further, while the bypass valve is closed, the fluid may not flow between the chambers, thereby enabling the hydraulic cylinder to extend and retract.

Figure 3:
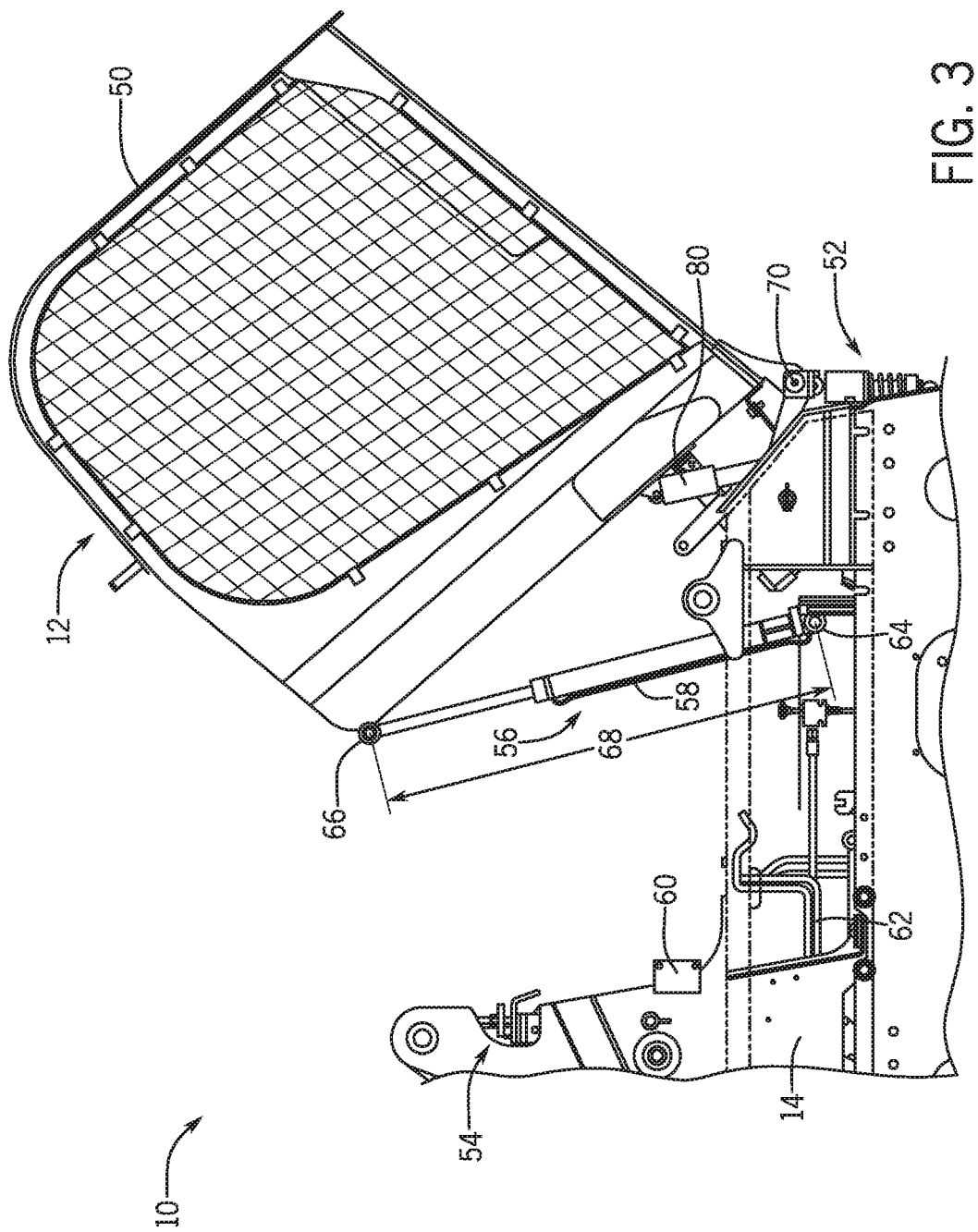
FIG. 3 is a side view of the tilting system of FIG. 2, in which the cab is in a raised position.

FIG. 3 is a side view of the tilting system 56 of FIG. 2, in which the cab 12 is in the raised position. As discussed above, after the locking mechanism 54 is in the unlocked position, the cab 12 may be rotated into the raised position. The hydraulic pump system 60 includes a fluid reservoir having a pump that sends fluid through the fluid line 62 and into the hydraulic cylinder 58. As the fluid enters the hydraulic cylinder 58, the length 68 of the hydraulic cylinder 58 may increase or decrease, depending on which chamber of the hydraulic cylinder 58 the fluid is pumped. As the length 68 of the hydraulic cylinder 58 increases, the cab 12 rotates about a pivot joint 70 into the raised position. Further, the hydraulic pump system 60 may include a valve, either internally or externally, to control flow of fluid to/from the hydraulic cylinder 58, and, thus, the length 68 of the hydraulic cylinder 58. Further, maintaining the length 68 of the hydraulic cylinder 58 maintains the position of the cab 12.

In the present embodiment, the work vehicle 10 includes a cab locking mechanism 80 to provide support to the cab 12 while it is in the raised position. The cab locking mechanism 80 may be utilized to maintain the cab 12 in the raised position, such that the weight of the cab 12 is not supported solely by the hydraulic cylinder 58. The cab locking mechanism 80 includes a substantially rigid member that may be moved into a locking position after the cab 12 is in the raised position. In some embodiments, the cab locking mechanism may include any suitable structure to maintain the position of the suspended cab in the raised position, including a strut, a clamp, or a bolt. When the cab 12 is in the raised position, the locking mechanism 80 may be moved into an unlocked position. After placing the locking mechanism 80 in the unlocked position, fluid may be pumped from one chamber of the hydraulic cylinder 58 to another to cause the hydraulic cylinder to retract, thereby lowering the cab 12 towards the lowered position.

Figure 4:
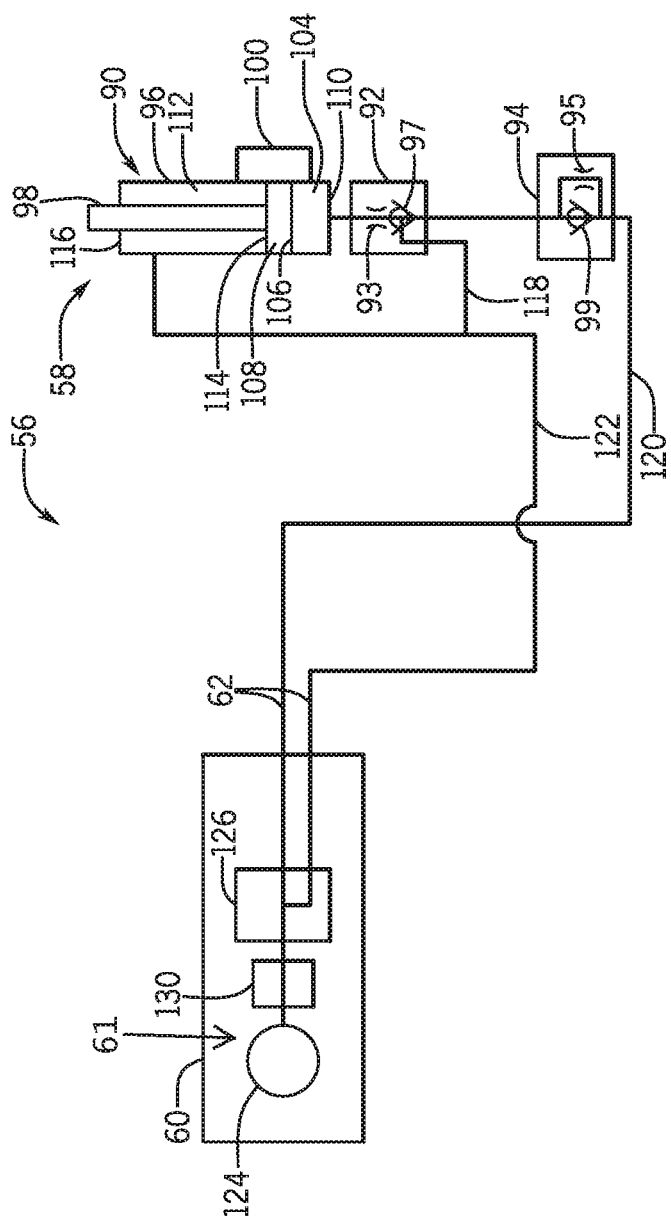
FIG. 4 is a block diagram of an embodiment a tilting system that may be employed within the work vehicle of FIG. 1.

FIG. 4 is a block diagram of an embodiment of the tilting system 56 that may be employed within the work vehicle of FIG. 1. The tilting system 56 includes the hydraulic cylinder 58, the fluid reservoir 61, the fluid lines 62, a cylinder 90, a first orifice assembly 92, and a second orifice assembly 94. In some embodiments, the tilting system 56 may include more hydraulic cylinders, such as 2, 3, 4, 5, 6, or more. Further, the hydraulic cylinder 58 includes a cylinder housing 96, a piston 108, a rod 98 coupled to the piston 108, and a bypass 100. Further, the walls of the cylinder housing 96 defines an enclosed chamber configured to contain a fluid. Further, the piston 108 substantially separates the enclosed chamber into a first enclosed chamber 104 and a second enclosed chamber 112. The first enclosed chamber 104 is defined by an end 106 of the piston 108, a cap 110, and the cylinder housing 96. The second enclosed chamber 112 is defined by a second end 114 of the piston 108, a gland 116, and the cylinder housing 96.

As fluid enters the first enclosed chamber 104, the fluid drives the piston 108 toward the gland 116, causing the rod 98 to extend. Similarly, as fluid enters the second enclosed chamber 112, the fluid drives the piston 108 toward the cap 110, causing the rod 98 to retract. In the present embodiment, the tilting system 56 includes the bypass 100 that selectively fluidly couples the first enclosed chamber 104 and the second enclosed chamber 112. The bypass 100 may include any structure, such as a line, a partially enlarged diameter (i.e., a portion (e.g., 30 degrees) of the diameter is increased) of a portion (e.g., the portion in which the piston 108 is located while the cab is in the lowered position) of the cylinder 90, or any other suitable structure. The first enclosed chamber 104 and the second enclosed chamber 112 may be fluidly coupled while the cab is in the lowered position. As discussed above, while the first enclosed chamber 104 and the second enclosed chamber 112 are fluidly coupled, the effects of the tilting system 56 on the suspension system are reduced. While the first enclosed chamber 104 and the second enclosed chamber 112 are fluidly coupled, the piston 108 may move toward either end of the cylinder housing 96 in response to external forces acting on the rod 98 (e.g., forces associated with movement of the cab relative to the chassis). Accordingly, the effects of the hydraulic cylinder 58 on the suspension system may be substantially reduced, as compared to a hydraulic cylinder whose enclosed chambers remain fluidly separate.

Further, the first orifice assembly 92 and the second orifice assembly 94 are fluidly coupled to one another and to the first enclosed chamber 104 of the cylinder 90. Each of the first orifice assembly 92 and the second orifice assembly 94 may include one or more orifices that control the flow rate of fluid to/from the first enclosed chamber 104. For example, the first orifice assembly 92 includes a first orifice 93 that may enable fluid flow at a predetermined rate. In addition, the second orifice assembly 94 includes a second orifice 95 that enables fluid flow at a predetermined rate. The rate of flow through the first orifice 93 and the second orifice 95 may be the same or different. Further, the first orifice assembly 92 includes a first check valve 97, and the second orifice assembly 94 includes a second check valve 99. Each of the first check valve 97 and the second check valve 99 are configured to enable fluid to flow in only one direction. In the present embodiment, the first check valve 97 and the second check valve 99 are configured to enable fluid to flow to the first enclosed chamber 104. Accordingly, as fluid flows toward the first enclosed chamber 104, the fluid flows through a first fluid line 120, then through the second check valve 99, then through the first check valve 97, then through the first orifice 93. As fluid flows toward the first enclosed chamber 104, the fluid does not flow through the second orifice 95, because the second check valve 99 resists fluid flow less than the second orifice.

In order to enable fluid flow away from the first enclosed chamber 104, the first check valve 97 is operated such that the first check valve 97 enable fluid to flow away from the first enclosed chamber 104 while simultaneously not allowing fluid to flow toward the first enclosed chamber 104. A pilot line 118 is utilized to operate the first check valve 97 to change the direction of fluid flow. In the present embodiment, the pilot line 118 is fluidly coupled to a second fluid line 122 and the first check valve 97. Further, the pilot line 118 is configured to operate the first check valve 97 after a threshold pressure in the pilot line has been reached. Accordingly, after the pressure in the second fluid line 122 reaches the threshold pressure, the pressure is transferred through the pilot line 118 and operates the first check valve 97 to reverse the flow of fluid through the first check valve 97.

After the first check valve 97 is operated, fluid may flow away from the first enclosed chamber 104. However, the second check valve 99 remains in the same position the enables fluid to flow only toward the first enclosed chamber 104. Thus, fluid flowing away from the first enclosed chamber 104 flows through the first orifice 93, then through the first check valve 97, then through the second orifice 95, then through the first fluid line 120. Accordingly, fluid flowing toward the first enclosed chamber 104 flows through the first orifice 93 and fluid flowing away from the first enclosed chamber 104 flows through the first orifice 93 and the second orifice 95. Accordingly, the flow rate toward the first enclosed chamber 104 may be different from the flow rate away from the first enclosed chamber 104. Thus, the rod 98 may extend at one rate and retract at a different rate. Further, the first orifice assembly 92 and the second strut orifice may be coupled to the hydraulic cylinder 58, positioned remote from the hydraulic cylinder 58, or any combination thereof.

The fluid reservoir 61 is utilized to store fluid for the hydraulic cylinder 58. As such, the fluid reservoir 61 includes a fluid tank 124 that may contain fluid for the hydraulic cylinder 58. Further, the fluid reservoir 61 includes a pump 130 that may be fluidly coupled to the fluid tank 124 and configured to drive fluid to and from the fluid tank 124 through the fluid line 62 to the hydraulic cylinder 58. The pump 130 may be manually or electrically driven, for example, the pump 130 may include and handle that enables a user to drive the pump 130. Further, the fluid output by the pump 130 flows through a control valve 126. The control valve 126 selectively fluidly couples the pump 130 to the first fluid line 120 or the second fluid line 122. If fluid flows to the first fluid line 120, the rod 98 is driven to extend, and if fluid flows to the second fluid line 122, the rod 98 is driven to retract.

While only certain features of the invention have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A tilting system for a suspended cab of a work vehicle comprising:
 a hydraulic cylinder coupled to a chassis of the work vehicle at a first end of the hydraulic cylinder and the suspended cab at a second end of the hydraulic cylinder, wherein the hydraulic cylinder is configured to extend to drive the suspended cab to rotate about a pivot joint positioned at a first longitudinal end portion of the suspended cab from a lowered position to a raised position, the hydraulic cylinder is configured to retract to drive the suspended cab to rotate about the pivot joint from the raised position to the lowered position, the second end of the hydraulic cylinder is coupled to a second longitudinal end portion of the suspended cab, opposite the first longitudinal end portion of the suspended cab, and the hydraulic cylinder is configured to be substantially horizontal while the suspended cab is in the lowered position.

2. The tilting system of claim 1, comprising a fluid reservoir comprising a fluid tank configured to contain fluid, wherein the fluid reservoir is fluidly coupled to the hydraulic cylinder via a plurality of fluid lines.

3. The tilting system of claim 2, comprising a pump fluidly coupled to the fluid tank, wherein the pump is configured to pressurize fluid flowing through at least one of the plurality of fluid lines.

4. The tilting system of claim 3, comprising a control valve configured to selectively fluidly couple the pump to a first fluid line of the plurality of fluid lines or a second fluid line of the plurality of fluid lines to control extension and retraction of the hydraulic cylinder.

5. The tilting system of claim 3, wherein the pump is manually driven.

6. The tilting system of claim 1, comprising a first orifice assembly and a second orifice assembly, wherein the first orifice assembly and the second orifice assembly are configured to control a first fluid flow rate for retracting the hydraulic cylinder, and a second fluid flow rate for extending the hydraulic cylinder.

7. The tilting system of claim 6, wherein the first orifice assembly comprises a first orifice and a first check valve, and the second orifice assembly comprises a second orifice and a second check valve, and wherein each of the first check valve and the second check valve is configured to enable fluid to flow toward the hydraulic cylinder.

8. The tilting system of claim 7, wherein the first check valve is configured to be operated by a pilot line, and operating the first check valve causes the check valve to enable fluid to flow away from the hydraulic cylinder.

9. The tilting system of claim 1, wherein the hydraulic cylinder comprises a first enclosed chamber and a second enclosed chamber, and fluid entering the first enclosed chamber is configured to extend the hydraulic cylinder, and fluid entering the second enclosed chamber is configured to retract the hydraulic cylinder.

10. The tilting system of claim 9, comprising a bypass configured to fluidly couple the first enclosed chamber and the second enclosed chamber while a piston of the hydraulic cylinder is in a retracted position.

11. A work vehicle comprising:
 a suspension system configured to reduce movement of the suspended cab relative to a chassis of the work vehicle;
 a pivot joint positioned at a first longitudinal end portion of the suspended cab and configured to couple the suspended cab to the chassis, wherein the pivot joint is configured to enable rotation of the suspended cab relative to the chassis; and
 a tilting system comprising:
  a hydraulic cylinder coupled to the chassis at a first end of the hydraulic cylinder and the suspended cab at a second end of the hydraulic cylinder, wherein the second end of the hydraulic cylinder is coupled to a second longitudinal end portion of the suspended cab, opposite the first longitudinal end portion of the suspended cab, the hydraulic cylinder is configured to extend to drive the suspended cab to rotate about the pivot joint from a lowered position to a raised position, the hydraulic cylinder is configured to retract to drive the suspended cab to rotate about the pivot joint from the raised position to the lowered position, and the hydraulic cylinder is configured to be substantially horizontal while the suspended cab is in the lowered position.

12. The work vehicle of claim 11, wherein the tilting system comprises a first mounting structure configured to rotatably couple the hydraulic cylinder to the chassis at the first end, and a second mounting structure configured to rotatably couple the hydraulic cylinder to the suspended cab at the second end.

13. The work vehicle of claim 11, wherein the tilting system comprises a first orifice assembly and a second orifice assembly, the first orifice assembly and the second orifice assembly are configured to control a first fluid flow rate for retracting the hydraulic cylinder, and a second fluid flow rate for extending the hydraulic cylinder.

14. The work vehicle of claim 11, comprising a fluid reservoir comprising a fluid tank configured to contain fluid, wherein the fluid reservoir is fluidly coupled to the hydraulic cylinder via a plurality of fluid lines.

15. The work vehicle of claim 14, wherein the tilting system comprises a pump fluidly coupled to the fluid tank, and the pump is configured to pressurize fluid flowing through the plurality of fluid lines.

16. A tilting system for a suspended cab of a work vehicle comprising:
a hydraulic cylinder coupled to a chassis of the work vehicle at a first end of the hydraulic cylinder and the suspended cab at a second end of the hydraulic cylinder, wherein the hydraulic cylinder is configured to extend to drive the suspended cab to rotate about a pivot joint positioned at a first longitudinal end portion of the suspended cab from a lowered position to a raised position, the hydraulic cylinder is configured to retract to drive the suspended cab to rotate about the pivot joint from the raised position to the lowered position, the second end of the hydraulic cylinder is coupled to a second longitudinal end portion of the suspended cab, opposite the first longitudinal end portion of the suspended cab, and the hydraulic cylinder is configured to be substantially horizontal while the suspended cab is in the lowered position;
a first mounting structure configured to rotatably couple the hydraulic cylinder to the chassis at the first end of the hydraulic cylinder; and
a second mounting structure configured to rotatably couple the hydraulic cylinder to the suspended cab at the second end of the hydraulic cylinder.

17. The tilting system of claim 16, wherein the first and second mounting structures enable the hydraulic cylinder to rotate as the suspended cab rotates from the lowered position to the raised position.

18. The tilting system of claim 16, wherein the hydraulic cylinder comprises a first enclosed chamber and a second enclosed chamber, and fluid entering the first enclosed chamber is configured to extend the hydraulic cylinder, and fluid entering the second enclosed chamber is configured to retract the hydraulic cylinder.

19. The tilting system of claim 18, comprising a bypass configured to fluidly couple the first enclosed chamber and the second enclosed chamber while a piston of the hydraulic cylinder is in a retracted position.

20. The tilting system of claim 16, comprising a fluid reservoir fluidly coupled to the hydraulic cylinder via a plurality of fluid lines, wherein the fluid reservoir comprises a fluid tank configured to contain fluid, and a pump fluidly coupled to the fluid tank, wherein the pump is configured to pressurize fluid flowing through at least one of the plurality of fluid lines.

* * * * *